United States Patent
Kubo et al.

(10) Patent No.: US 8,483,117 B2
(45) Date of Patent: Jul. 9, 2013

(54) WIRELESS COMMUNICATION APPARATUS

(75) Inventors: Yuki Kubo, Osaka (JP); Kentarou Yanagihara, Hyogo (JP); Hiroshi Nishimura, Osaka (JP); Masanori Nozaki, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 374 days.

(21) Appl. No.: 12/801,419

(22) Filed: Jun. 8, 2010

(65) Prior Publication Data
US 2011/0051652 A1 Mar. 3, 2011

(30) Foreign Application Priority Data
Aug. 31, 2009 (JP) .................................. 2009-199857

(51) Int. Cl.
*H04J 3/08* (2006.01)
(52) U.S. Cl.
USPC .......................................... 370/315; 370/389
(58) Field of Classification Search
USPC .................................. 370/390, 312, 389, 315
See application file for complete search history.

(56) References Cited

U.S. PATENT DOCUMENTS 7,876,756 B2 * 1/2011 Muramoto et al. ........... 370/390
7,933,269 B2 * 4/2011 Cheng et al. .................. 370/390

OTHER PUBLICATIONS

"ZigBee Specification" Document 053474r17, p. 392, pp. 402-403, Date of publication Oct. 19, 2007.

* cited by examiner

*Primary Examiner* — Chandrahas Patel
(74) *Attorney, Agent, or Firm* — Rabin & Berdo, P.C.

(57) ABSTRACT

A packet is transmitted from a source node to a destination node via a relay path in a multi-hop network. The packet is transmitted by cache routing or source routing, depending on the presence or absence of information identifying the destination node in a history table maintained at the source node. In source routing, relay path information is included in the packet. In cache routing, relay nodes obtain routing information from entries in their own cache routing tables. Each entry indicates only the destination node and the next relay node, and each cache routing table has a limited size. When a series of packets are transmitted to the second node, cache routing can be used for all but the first packet, thereby reducing packet overhead.

12 Claims, 5 Drawing Sheets

WIRELESS COMMUNICATION APPARATUS

BACKGROUND OF THE INVENTION

1. Field of the Invention

The present invention relates to wireless communication apparatus and a multi-hop communication method that uses source routing.

2. Description of the Related Art

A multi-hop communication method using source routing is described in the ZigBee Specification, Document 053474r17. When a packet is transmitted, the source node adds a header listing the addresses of all the nodes on the relay path to the destination node (see Section 3.6.3.3.1 of the ZigBee Specification). Each node that relays the packet increments an index value in the header that indicates the next relay node in the address list (Section 3.6.3.3.2). The route is originally established by transmission of a route record packet from the destination node to the source node. Each node that relays the route record packet adds its own address to the address list (Section 3.6.3.5.4), enabling the source node to identify the route by which the route record packet arrived from the destination node.

Source routing enables multi-hop communication to be carried out without storing and maintaining routing tables at the relay nodes. Memory and processing power requirements at the relay nodes are thereby reduced, conserving energy and permitting the use of low-cost processors.

Source routing is problematic, however, in that the header of every packet must include the addresses of all the relay nodes from the source node to the destination node. As the number of relay hops increases, the size of the header increases and the payload data size must be reduced accordingly. The ZigBee specification is based on a standard (IEEE 802.15.4) that sets a maximum size of 128 bytes per packet, so when there are many hops, the address list overhead occupies a large part of each packet. More packets must then be used to transmit a given amount of information, consuming extra power and delaying processing of the information in software layers above the network layer.

There is a particular need for a more effective method of transmitting a consecutive series of packets to the same destination node, without transmitting the same address list repeatedly in the header information.

SUMMARY OF THE INVENTION

A general object of the present invention is to reduce power consumption and expedite processing in multi-hop networks in which source routing is employed.

A more specific object is to reduce overhead in transmitted packets.

The invention provides a method of transmitting a packet from a first node to a second node via a relay path including at least one relay node. The method includes:

checking a history table at the first node;
adding information specifying the second node, the relay path, and source routing to the header of the packet if the second node is not identified in the history table;
adding information specifying the second node and cache routing but not specifying the relay path to the header of the packet if the second node is identified in the history table;
transmitting the packet from the first node;
checking the header of the packet at each relay node on the relay path;
transmitting the packet from the relay node to a next relay node indicated in the header if the header specifies source routing;
transmitting the packet from the relay node to a next relay node indicated in a cache routing table at the relay node if the header indicates cache routing; and
receiving the packet at the second node.

The history and cache routing tables may be updated each time a packet is transmitted by source routing. Alternatively, the history and cache routing tables may be updated each time a route record packet is transmitted.

When a series of packets are sent from the first node to the second node, source routing can be used for the first packet and cache routing for the subsequent packets. Alternatively, cache routing can be used for all the packets if a route record packet is sent in advance from the second node to the first node. In either case, overhead in most or all of the packets is reduced because they need not include an address list or other relay path information. Consequently, fewer packets are required to transmit a given amount of payload information, less power is consumed in transmitting and receiving the packets, processing is expedited, and throughput is improved.

The invention also provides a first wireless communication apparatus and a second wireless communication apparatus for use in a multi-hop network. A node in the network may include both the first and second wireless communication apparatuses, or only one of them.

The first wireless communication apparatus has a history table that stores information identifying a destination or source node of a previously transmitted or received packet that included relay path information. When an outgoing packet is to be transmitted, a transmitting method selector determines whether the destination node of the outgoing packet is identified in the history table.

If the destination node of the outgoing packet is identified in the history table, a cache routing transmitting processor transmits the outgoing packet with information specifying its destination node and cache routing, but not specifying the relay path.

If the destination node of the outgoing packet is not identified in the history table, a source routing transmitting processor transmits the outgoing packet with information specifying its destination node, the relay path, and source routing.

The second wireless communication apparatus has a cache routing table, each entry in which lists a destination node and a relay node. A relay/receiving method selector examines the headers of newly received packets to decide whether to relay each received packet by source routing or cache routing.

When the decision is to use cache routing, a cache routing relay/receiving processor finds an entry in the cache routing table listing the destination node of the received packet, and sends the received packet to the relay node listed in this entry.

When the decision is to use source routing, a source routing relay/receiving processor sends the received packet to a relay node specified in the relay path information in the header of the packet.

The invention also provides a machine readable tangible medium storing a wireless communication program for transmitting, relaying, and receiving packets by the method described above.

DETAILED DESCRIPTION OF THE INVENTION

Embodiments of the invention will now be described with reference to the attached drawings, in which like elements are indicated by like reference characters.

First Embodiment

In the first embodiment, the invention is applied in the wireless communication devices or nodes of a multi-hop wireless network. Each of the nodes is equipped with the wireless communication apparatus 100A, 100B shown in FIGS. 1 and 2. Wireless communication apparatus 100A operates when a node acts as a relay or destination node. Wireless communication apparatus 100B operates when the node acts as a source node.

Figure 1:
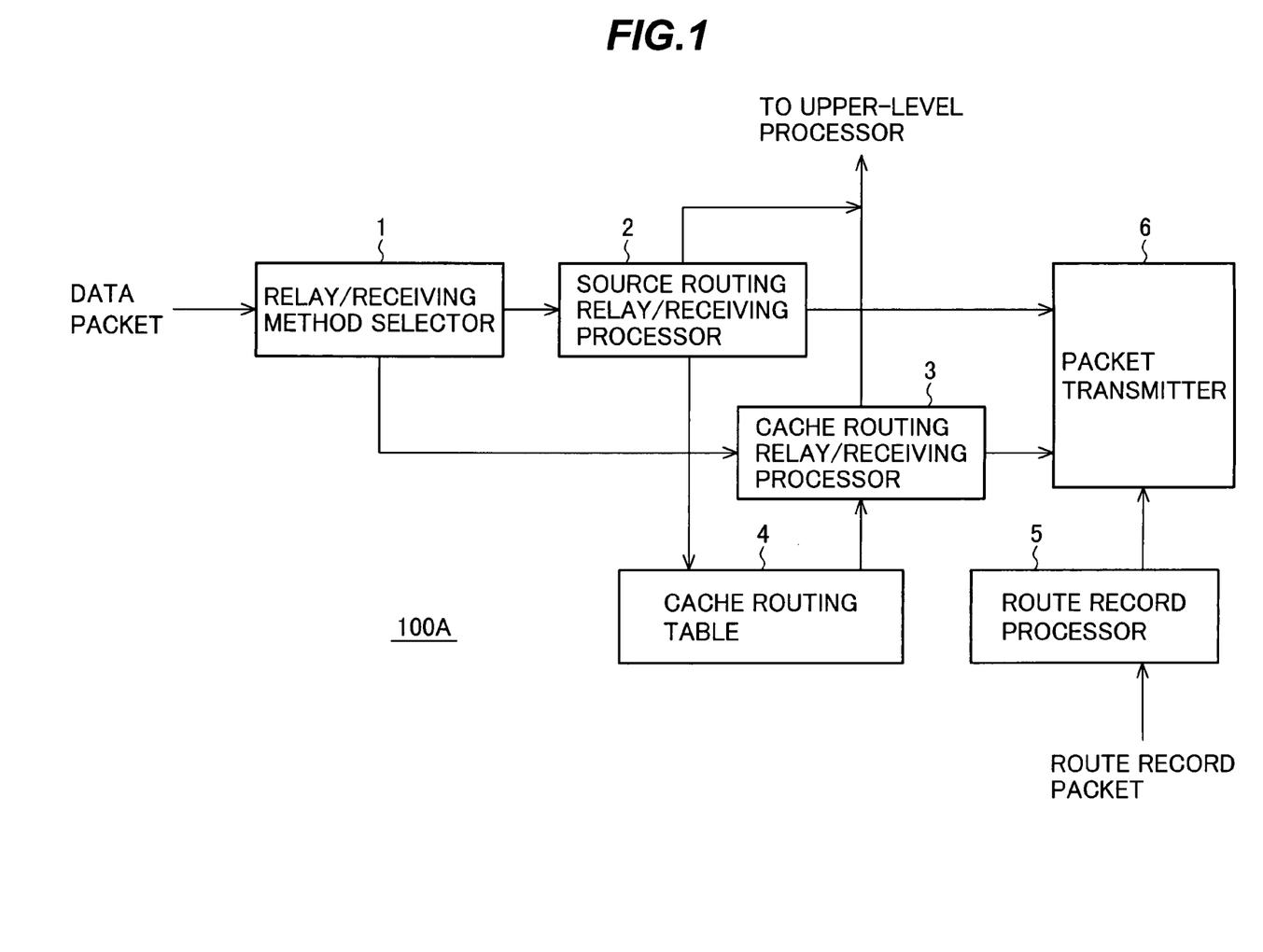
FIG. 1 is a block diagram illustrating the structure of a wireless communication apparatus for a relay and receiving node in a first embodiment of the invention.

Referring to FIG. 1, wireless communication apparatus 100A includes at least a relay/receiving method selector 1, a source routing relay/receiving processor 2, a cache routing relay/receiving processor 3, a cache routing table 4, a route record processor 5, and a packet transmitter 6.

The relay/receiving method selector 1 checks a routing flag included in the header of a received packet and decides how the packet is to be routed: by source routing or cache routing. The routing flag is set or cleared by the source node from which the packet was originally transmitted. If the routing flag is set, the relay/receiving method selector 1 selects cache routing and gives the received packet to the cache routing relay/receiving processor 3. If the routing flag is cleared, the relay/receiving method selector 1 selects source routing and gives the received packet to the source routing relay/receiving processor 2.

The source routing relay/receiving processor 2 performs a conventional source routing process. If its own node is the destination node of the received packet, the source routing relay/receiving processor 2 notifies an upper-level processor (not shown) of the reception of the packet. If the destination node is to another node, the source routing relay/receiving processor 2 submits the packet to the packet transmitter 6, to be relayed to a node in a relay path specified as an address list in the packet header.

When relaying a packet, the source routing relay/receiving processor 2 may increment an index value pointing to a specific address in the address list, as described in the ZigBee Specification, and the packet transmitter 12 may transmit the packet to the node with the address indicated by the incremented index value. Alternatively, the source routing relay/receiving processor 2 may delete its own address from the bottom of the address list and the transmitter 12 may transmit the packet to the node now at the bottom of the address list. This alternative method is preferable in that the address list is shortened by one address every time a packet is relayed, thereby reducing the power consumed in transmitting and receiving the packet.

The source routing relay/receiving processor 2 also updates the cache routing table 4 by adding an entry consisting of a destination address and a relay address. The destination address is address of the final destination node of the received packet. The relay address is the address of the next relay node on the route to the destination node. In one scheme, the source routing relay/receiving processor 2 finds its own address in the address list, selects the address listed next as the relay address, and selects the address listed last in the address list as the destination address.

The cache routing relay/receiving processor 3, like the source routing relay/receiving processor 2, notifies an upper-level processor (not shown) if the received packet is addressed to its own node. Otherwise, the cache routing relay/receiving processor 3 refers to the cache routing table 4 to determine the relay address of the received packet, performs relay processing, and submits the packet to the packet transmitter 6. Specifically, using the destination address included in the header of the received packet as a search key, the cache routing relay/receiving processor 3 searches the cache routing table 4 and selects a relay address paired with the destination address.

The entries stored in the cache routing table 4 are address pairs, each including a destination address and a relay address. The number of entries in the cache routing table 4 is limited. When the limit is reached, the oldest entry, for example, is deleted to make room for the next entry. It is preferable, although not absolutely necessary, for all nodes to have the same limit.

When a route record packet, which includes an address list listing the nodes that have relayed the packet so far, is received, the route record processor 5 adds the address of its own node to the address list and submits the packet to the packet transmitter 6. The purpose of a route record packet is to enable each node that receives the route record packet to trace a route back to the source node. Routing information obtained in this way is used by wireless communication apparatus 100B as described later.

The packet transmitter 6 transmits the packets submitted by the source routing relay/receiving processor 2, cache routing relay/receiving processor 3, and route record processor 5.

Figure 2:
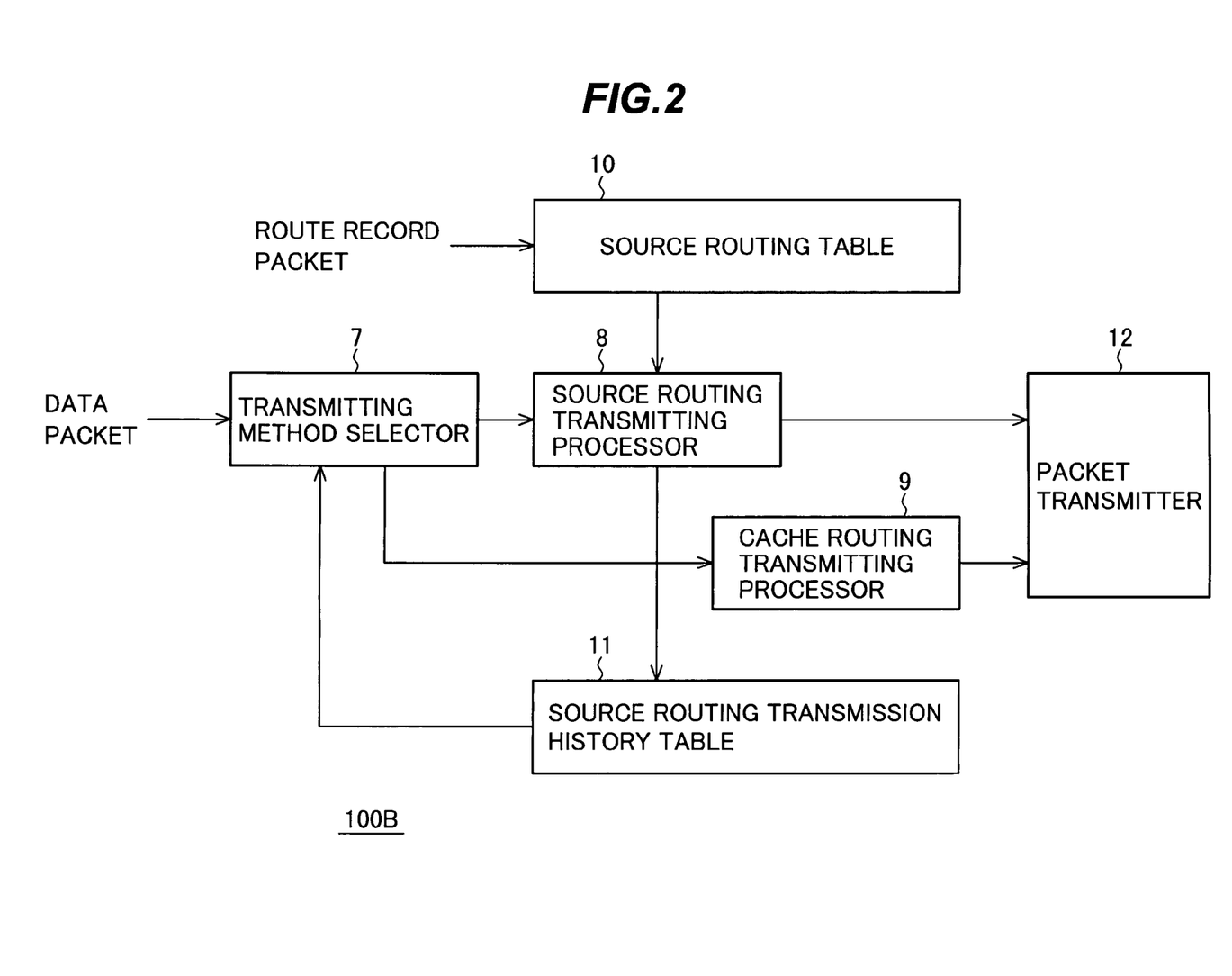
FIG. 2 is a block diagram illustrating the structure of a wireless communication apparatus for a transmitting node in the first embodiment of the invention.

Referring to FIG. 2, the wireless communication apparatus 100B includes at least a transmitting method selector 7, a source routing transmitting processor 8, a cache routing transmitting processor 9, a source routing table 10, a source routing transmission history table 11, and a packet transmitter 12.

When the transmitting method selector 7 receives a packet to be transmitted, it refers to the source routing transmission history table 11 to determine whether to have the packet transmitted by the source routing transmitting processor 8 or the cache routing transmitting processor 9, sets or clears the routing flag in the header of the packet, and transfers the packet to the source routing transmitting processor 8 or the cache routing transmitting processor 9. If the destination of the packet appears as an entry in the source routing transmission history table 11, the transmitting method selector 7 sets the routing flag to instruct relay nodes to relay the packet by using their cache routing tables, and transfers the packet to the cache routing transmitting processor 9. If the destination of the packet does not appear as an entry in the source routing transmission history table 11, the transmitting method selector 7 clears the routing flag to instruct relay nodes to relay the packet by using an address list included in the packet header, and transfers the packet to the source routing transmitting processor 8.

As explained below, the entries in the source routing transmission history table 11 are the destinations of packets that were recently transmitted with source routing address lists. The nodes that relayed these packets still retain entries derived from those packets in their cache routing tables 4. Other packets transmitted to those destination addresses can therefore be transmitted by cache routing, without placing an address list in the packet header.

The source routing transmitting processor 8 performs a conventional source routing process. That is, the source routing transmitting processor 8 refers to the source routing table 10 to create an address list specifying a relay path leading to the destination of a packet, adds this address list to the header of the packet, and gives the packet to the packet transmitter 12. The source routing transmitting processor 8 also writes the destination of the packet into the source routing transmission history table 11.

The cache routing transmitting processor 9 adds only the address of the destination node to the header of the packet and gives the packet to the packet transmitter 12.

The source routing table 10 stores the address lists included in received route record packets. As explained above, such an address list lists the nodes that have relayed the route record packet from the source node at which the route record packet originated. In the source routing table 10 the address of that source node is listed as a destination address, and the addresses of the relay nodes are listed, in reverse order, as the addresses of the nodes that can relay subsequent packets to that destination address. The source routing table 10 may be organized by pairing the address of the destination node with the list of relay addresses.

The source routing transmission history table 11 stores information identifying the destination of each packet transmitted by the source routing transmitting processor 8. The amount of information that can be stored in the source routing transmission history table 11 has an upper limit; when the upper limit is reached, the oldest entry is deleted to make room for the next entry. The source routing transmission history table 11 in wireless communication apparatus 100B and the cache routing table 4 in wireless communication apparatus 100A preferably have the same limit number of entries, to avoid cases in which the cache routing relay/receiving processor 3 at a relay node cannot find a needed entry in its cache routing table 4.

The packet transmitter 12 transmits packets submitted by the source routing transmitting processor 8 and cache routing transmitting processor 9.

Figure 3:
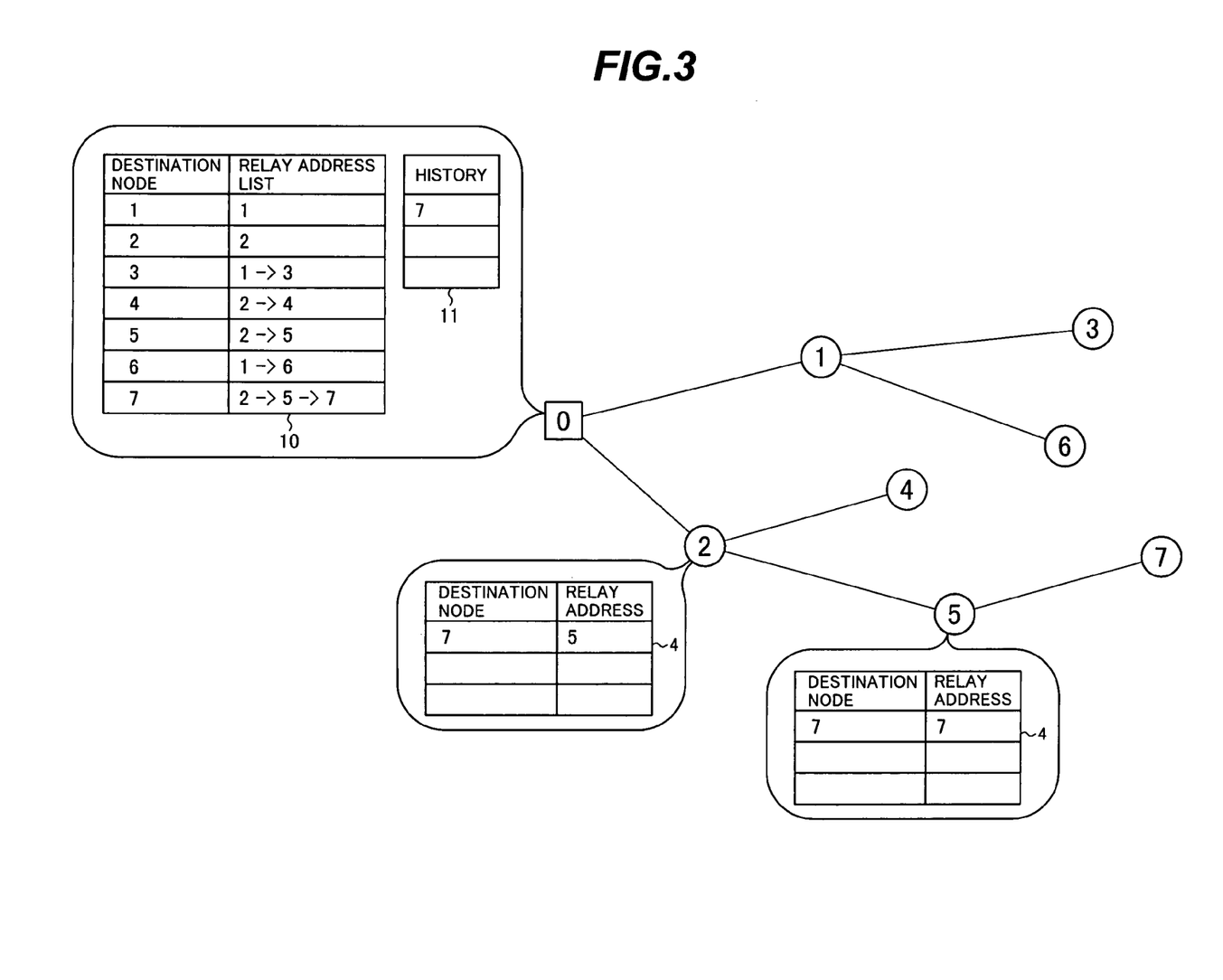
FIG. 3 is a diagram illustrating communication processing in the first embodiment.

The operation of the first embodiment will now be described with reference to FIGS. 1 to 3. FIG. 3 shows a network with eight nodes indicated by numbered circles and a numbered square, the numbers being the addresses of the nodes. Node zero acts as a network coordinator and is the source node of the transmissions described below.

Each of nodes one to seven has already transmitted a route record packet and node zero has already received these route record packets, so the source routing table 10 at node zero includes address lists leading to all other nodes in the network. The exemplary entries in the source routing table 10 in FIG. 3 indicate that a packet destined to node one should be sent directly to node one, that a packet destined to node three should be sent to node one and relayed from node one to node three, and so on.

The transmission of two packets from node zero to node seven will be described as an example. The first of these two packets is the first packet transmitted by node zero, so when the first packet is transmitted the source routing transmission history table 11 at node zero is empty.

Since the transmitting method selector 7 at node zero does not find any entry for node seven in its source routing transmission history table 11, it clears the routing flag to indicate that the first packet is to be relayed by source routing, and passes the first packet to the source routing transmitting processor 8.

The source routing transmitting processor 8 retrieves a relay address list leading to node seven from the source routing table 10. As shown in FIG. 3, the relay address list stored in the source routing table 10 for destination node seven includes the addresses two, five, and seven. The source routing transmitting processor 8 places this address list in the header of the first packet and submits the packet to the packet transmitter 12. The source routing transmitting processor 8 also stores an entry identifying the destination node (node seven) in the source routing transmission history table 11 as shown in FIG. 3. The packet transmitter 12 then transmits the first packet to node two.

The relay/receiving method selector 1 at node two checks the routing flag in the header of the packet, finds that the packet is to be relayed by source routing, and transfers the packet to the source routing relay/receiving processor 2. The source routing relay/receiving processor 2 reads the address list in the packet header, finds 'two' in the address list, sees that node two is not the destination of the packet, and gives the next address (five) in the address list to the packet transmitter 6 as the relay address of the packet. From the address list, the source routing relay/receiving processor 2 also extracts the relay address (five) and the destination address (seven) and stores them as a new entry in the cache routing table 4 at node two, as shown in FIG. 3. The packet transmitter 6 at node two transmits the packet to node five.

A similar process is performed at node five. The source routing relay/receiving processor 2 at node five stores an entry in its cache routing table 4 with 'seven' as both the relay address and the destination address, as shown in FIG. 3, and the packet transmitter 6 transmits the packet from node five to node seven.

The relay/receiving method selector 1 at node seven checks the routing flag in the header of the received packet and transfers the packet to the source routing relay/receiving processor 2. The source routing relay/receiving processor 2 checks the address list in the header, finds that node seven is the destination of the packet, and notifies an upper-level processor that the packet has been received. Thus the packet arrives at its destination.

Next, when the second packet is transmitted from node zero to node seven, since an entry identifying node seven is now present in the source routing transmission history table 11 at node zero, the transmitting method selector 7 at node zero gives the second packet to the cache routing transmitting processor 9.

The cache routing transmitting processor 9 sets the routing flag to indicate that the packet is to be relayed by cache routing and places the address of the final destination node (seven) in the header of the packet. The packet transmitter 12 transmits the packet to node two.

From the routing flag in the header of the packet, the relay/receiving method selector 1 at node two determines that the packet is to be relayed by cache routing and gives the packet to the cache routing relay/receiving processor 3. The cache routing relay/receiving processor 3 refers to the cache routing table 4 to find the relay address corresponding to the destination address included in the header of the packet. Since the packet header indicates destination address seven and the cache routing table 4 has an entry in which destination address seven is paired with relay address five, the cache routing relay/receiving processor 3 determines that the packet is to be relayed to node five. The packet transmitter 6 transmits the packet to node five.

A similar operation is performed at node five. The cache routing relay/receiving processor 3 determines from the cache routing table 4 at node five that the relay address is seven, and the packet transmitter 6 transmits the packet to node seven. The packet thus arrives at its destination.

As this example shows, by caching a small number of entries in a cache routing table 4, when relaying a series of packets toward the same destination, a node can relay all but the first packet on the basis of the information in the cache routing table 4, without requiring an address list in the packet header. The header size can therefore be reduced and more payload data can be placed in each packet. As a result, fewer packets have to be sent and processed, throughput is improved, and less energy is consumed at each node that transmits, relays, or receives the packets.

Similar effects are obtained for any route that is used frequently enough to maintain entries in the source routing transmission history table 11 at the source node and the routing tables 4 at the relay nodes.

Conventional schemes use source routing for all packets, in which case the address list overhead in every packet is a problem, or use routing tables for all packets, in which case large routing tables must be maintained at every node, memory space becomes a problem, and table maintenance overhead also becomes a problem. By selectively using both source routing and small cache routing tables, the first embodiment is able to reduce address list overhead and improve network throughput without using up large amounts of memory at the nodes and without requiring extensive table maintenance.

Second Embodiment

Figure 4:
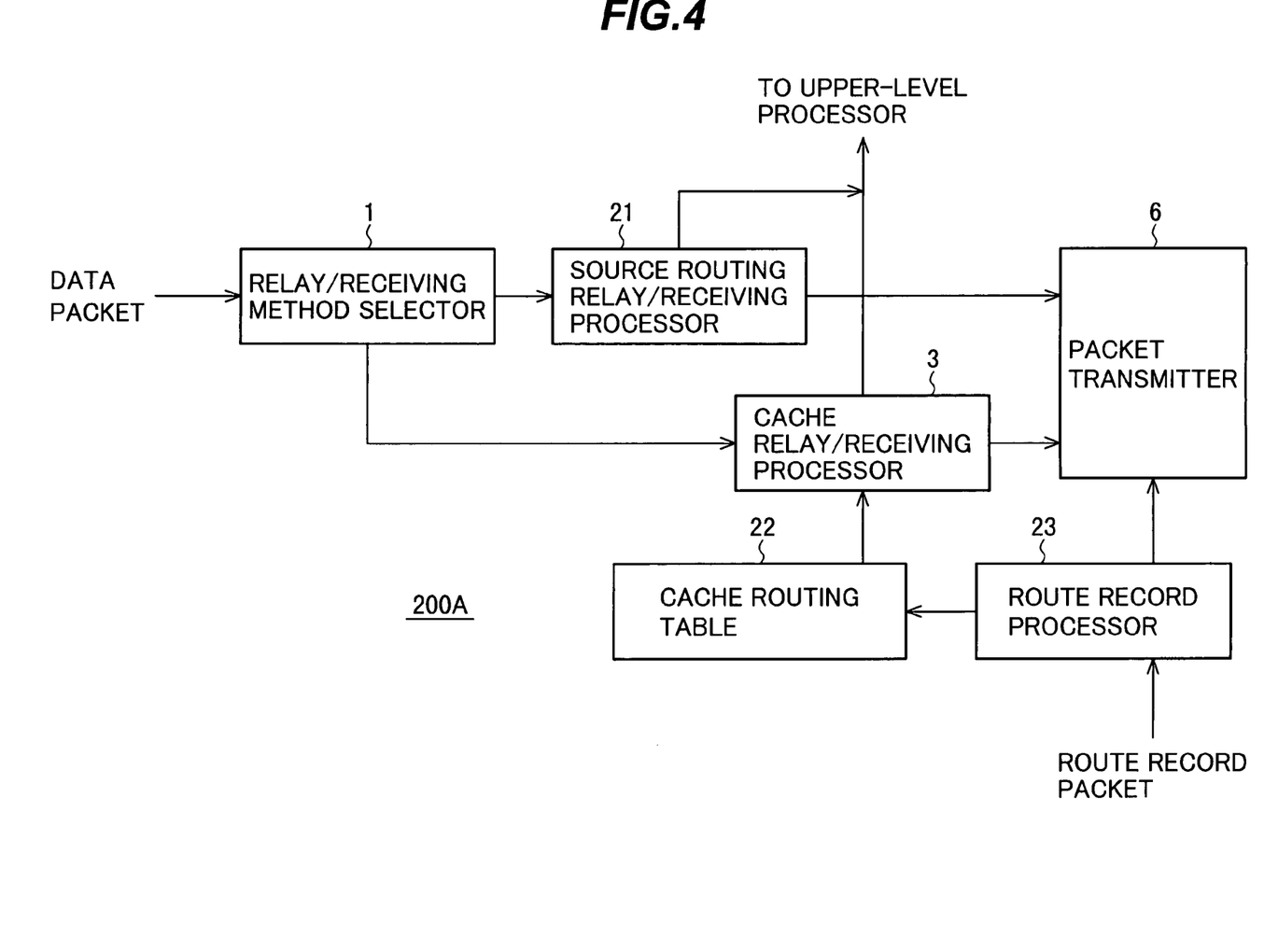
FIG. 4 is a block diagram illustrating the structure of a wireless communication apparatus for a relay and receiving node in a second embodiment of the invention.
Figure 5:
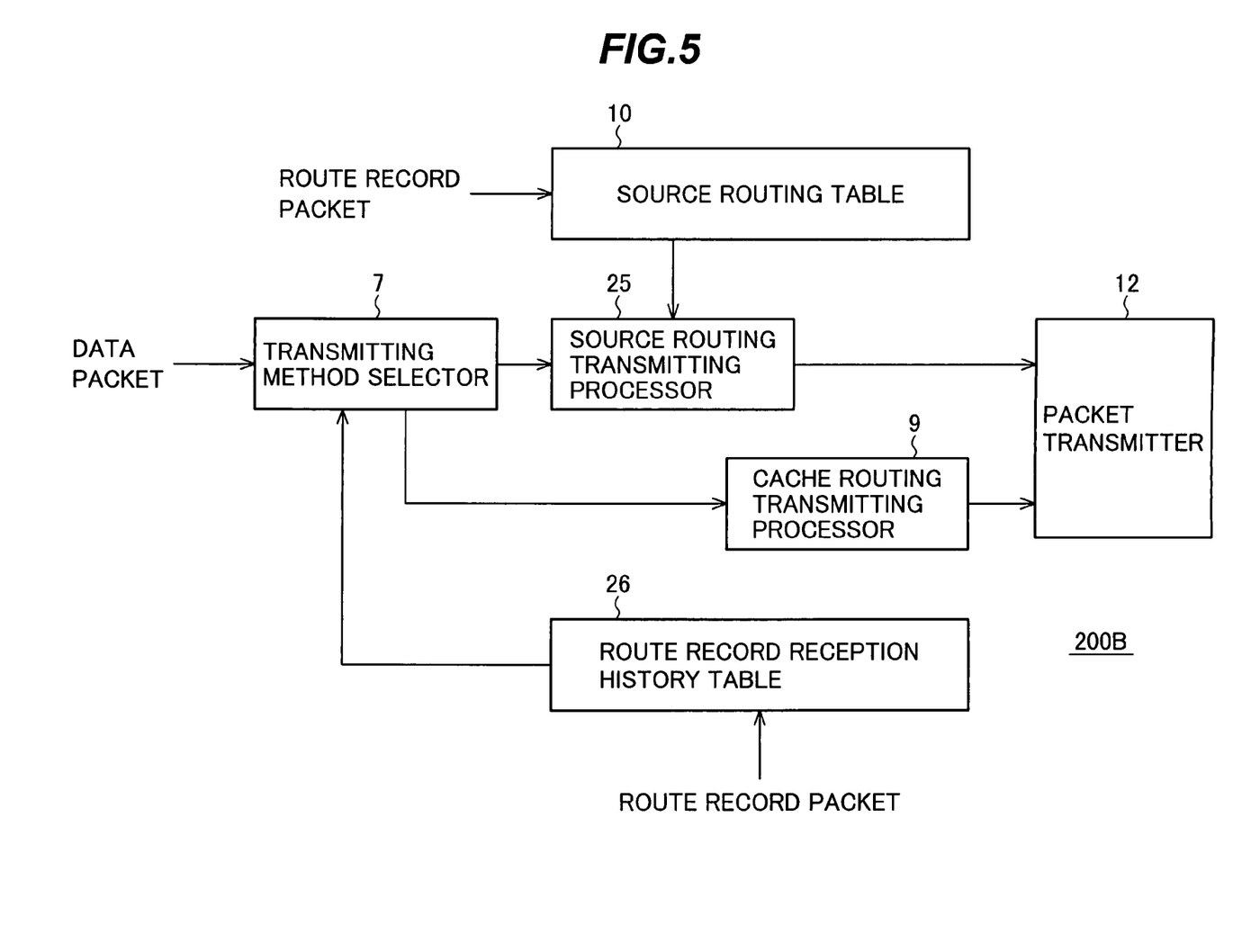
FIG. 5 is a block diagram illustrating the structure of a wireless communication apparatus for a transmitting node in the second embodiment.

The second embodiment differs from the first embodiment in that the cache routing tables are updated when a route record packet is received. The second embodiment includes wireless communication apparatus 200A, 200B corresponding to the wireless communication apparatus 100A, 100B in the first embodiment.

Referring to FIG. 4, wireless communication apparatus 200A comprises at least a relay/receiving method selector 1, cache routing relay/receiving processor 3, and packet transmitter 6 as in the first embodiment, and a modified source routing relay/receiving processor 21, cache routing table 22, and route record processor 23.

When a route record packet is received, the route record processor 23 updates the cache routing table 22. The cache routing table 22 stores paired destination addresses and relay addresses as entries, as in the first embodiment.

In the relay address list in a route record packet, the address of the source node appears at the top of the list, followed by the addresses of successive nodes that relayed the packet, so the route record processor 23 sets the top address in the list as a destination address in the cache routing table 22, and sets the bottom address in the list as the paired relay address.

The source routing relay/receiving processor 21 performs the same processing as in the first embodiment, except that it does not update the cache routing table 22. The cache routing table 22 is modified from the first embodiment in that it is updated by the route record processor 23 instead of the source routing relay/receiving processor 21.

Referring to FIG. 5, wireless communication apparatus 200B comprises at least a transmitting method selector 7, a cache routing transmitting processor 9, a source routing table 10, and a packet transmitter 12 as in the first embodiment, a modified source routing transmitting processor 25, and a route record reception history table 26.

When a route record packet is received, the source address at the top of its address list is stored as an entry in the route record reception history table 26. When the number of entries stored in the route record reception history table 26 reaches an upper limit, old entries are deleted to make room for new entries.

The route record reception history table 26 is used by the transmitting method selector 7 in the same way as the source routing transmission history table 11 in the first embodiment. The transmitting method selector 7 decides to transmit a packet by cache routing if the destination address of the packet appears in the route record reception history table 26, and by source routing if the address of the packet does not appear in the route record reception history table 26.

The source routing transmitting processor 25 operates as in the first embodiment, except that it does not update a source routing transmission history table.

The operation of the second embodiment will now be described with reference to FIGS. 3 to 5. First the processing of route record packets will be described.

Suppose, for example, that node seven in FIG. 3 creates and transmits a route record packet, placing its own address 'seven' as the sole address in the address list. The route record packet including this address list is received by node five.

When node five receives the route record packet, 'seven' is both the top address and the bottom address in the address list in the packet, so the route record processor 23 at node five stores 'seven' as both the destination address and the relay address of a new entry in the cache routing table 22. The route record processor 23 also adds its own address to the address list, and the packet transmitter 6 transmits the route record packet onward with the updated address list.

The route record packet is next received by node two. The address list now begins with 'seven' and ends with 'five', so the route record processor 23 at node two stores a new entry in the cache routing table 22 with 'seven' as a destination address and 'five' as a relay address. The route record processor 23 also adds its own address (two) to the address list, and the packet transmitter 6 transmits the route record packet onward.

The route record packet is next received by node zero. As node zero is the network coordinator, when it receives the route record packet it stores the address list in the route record packet in its source routing table 10, and writes the source address at the top of the address list as an entry in the route record reception history table 26 to indicate that a route to node seven has been established.

Later, when node zero has a packet to transmit to node seven, the transmitting method selector 7 at node zero checks the route record reception history table 26. If an entry for node seven is still present in the route record reception history table 26, the packet is given to the cache routing transmitting processor 9 to be transmitted by cache routing, with the routing flag set and without an address list in the header of the packet. Subsequent processing takes place as described in the first embodiment until the packet reaches its destination at node seven.

If the entry for node seven has been deleted from the route record reception history table 26, the packet is given to the source routing transmitting processor 25. The source routing transmitting processor 25 reads the address list leading to node seven that has been stored in the source routing table 10, places this address list in the header of the packet, and clears the routing flag, and the packet is transmitted by source routing as described in the first embodiment.

The first and second embodiments have generally similar effects, but have different triggers for updating the routing tables at relay and receiving nodes. The frequency with which source routing must be used depends on the pattern of traffic flow in the network, so in some networks the first embodiment may be more effective while in other networks the second embodiment may be more effective.

The network in the first and second embodiments are used may be, for example, a sensor network with hundreds or thousands of nodes, in which packets may be relayed over long paths with many relay hops. Using cached routing tables to reduce address list overhead in networks of this size can significantly improve network throughput and efficiency, reduce network power consumption, and extend battery life at battery-operated nodes.

The first and second embodiments can be practiced in wireless communication devices with a conventional hardware configuration including, for example, a central processing unit (CPU), random access memory (RAM), read only memory (ROM), and electrically erasable and programmable read only memory (EEPROM) or flash memory, by storing programs implementing the functions of the blocks in FIGS. 1 and 2, or 4 and 5. When the CPU executes the programs, the device operates as described in the first and second embodiments.

Limiting the amount of information stored in the history tables and cache routing tables as in the first and second embodiments is particularly effective for routing packets transmitted from a single source node such as node zero in FIG. 3.

Instead of placing upper limits on the amount of information stored in the history and cache routing tables, however, it is possible to retain information in these table for a limited span of time, in which case packets transmitted from any number of source nodes can be reliably routed.

The invention is not limited to use in wireless communication devices complying with any particular standard, but it is expected to be useful in short-range wireless communication devices complying with the IEEE 802.15.4 standard and in so-called Bluetooth devices (Bluetooth is a registered trademark).

Those skilled in the art will recognize that further variations are possible within the scope of the invention, which is defined in the appended claims.

What is claimed is:

1. A method of transmitting a packet from a first node in a network to a second node in the network via a relay path including at least one relay node in the network, the method comprising:
    checking a history table stored at the first node;
    adding information specifying the second node, the relay path, and source routing to a header of the packet if the second node is not identified in the history table;
    adding information specifying the second node and cache routing but not specifying the relay path to the header of the packet if the second node is identified in the history table;
    transmitting the packet with the information added to its header from the first node;
    checking the header of the packet at each relay node on the relay path;
    transmitting the packet from said each relay node to a next relay node in the relay path specified in the header of the packet if the header specifies source routing;
    transmitting the packet from said each relay node to a next relay node indicated in a cache routing table at the relay node if the header of the packet specifies cache routing;
    receiving the packet at the second node;
    storing information identifying the second node in the history table at the first node if the second node is not already identified in the history table; and
    storing a new entry in the cache routing table at said each relay node, the new entry listing the second node as a destination node and the next relay node indicated in the relay path specified in the header of the packet as a relay node, if the header specifies source routing.

2. The method of claim 1, wherein the first node functions as a coordinating node in the network.

3. The method of claim 1, wherein the history table stores a limited amount of information, and the cache routing table at said each relay node stores a correspondingly limited amount of information.

4. A method of transmitting a packet from a first node in a network to a second node in the network via a relay path including at least one relay node in the network, the method comprising:
    checking a history table stored at the first node;
    adding information specifying the second node, the relay path, and source routing to a header of the packet if the second node is not identified in the history table;
    adding information specifying the second node and cache routing but not specifying the relay path to the header of the packet if the second node is identified in the history table;
    transmitting the packet with the information added to its header from the first node;
    checking the header of the packet at each relay node on the relay path;
    transmitting the packet from said each relay node to a next relay node in the relay path specified in the header of the packet if the header specifies source routing;
    transmitting the packet from said each relay node to a next relay node indicated in a cache routing table at the relay node if the header of the packet specifies cache routing;
    receiving the packet at the second node;
    transmitting a route record packet from the second node to the first node via the relay path, the route record including an address list, the second node placing its own address in the address list, each relay node on the relay path adding its own address to the address list when relaying the route record packet;
    receiving the route record packet at the first node; and
    storing the address list in a source routing table at the first node.

5. The method of claim 4, further comprising:
    adding a new entry to the cache routing table at said each relay node, the new entry listing the second node as a destination node and a node indicated in the address list as a relay node, when the route record packet is received at said each relay node; and
    storing the address of the second node in the history table, to identify the second node, when the route record packet is received at the first node.

6. A wireless communication apparatus for use in a multi-hop network, comprising:
    a cache routing table for storing entries, each entry listing a destination node and a relay node;
    a relay/receiving method selector for examining a header of a received packet to decide whether to relay the received packet by source routing or by cache routing;

a cache routing relay/receiving processor for, when the relay/receiving method selector decides to relay the received packet by cache routing, finding an entry in the cache routing table listing a destination node specified in the received packet, and relaying the received packet to the relay node listed in the entry found in the cache routing table; and a source routing relay/receiving processor for, when the relay/receiving method selector decides to relay the received packet by source routing, relaying the received packet to a relay node indicated in a relay path specified in the received packet;

wherein, when the relay/receiving method selector decides to relay the received packet by source routing, the cache routing relay/receiving processor stores the specified destination node and the indicated relay node as a new entry in the cache routing table.

7. A wireless communication apparatus for use in a multi-hop network, comprising:

a history table for storing information identifying a destination node of a previously transmitted packet including relay path information or a source node of a previously received packet including relay path information;

a transmitting method selector for determining whether information identifying a destination node of an outgoing packet is stored in the history table;

a cache routing transmitting processor for transmitting the outgoing packet with a header specifying the destination node of the outgoing packet and cache routing, but not specifying a relay path, if the destination node of the outgoing packet is identified in the history table; and a source routing transmitting processor for transmitting the outgoing packet with a header specifying the destination node of the outgoing packet, the relay path, and source routing, if the destination node of the outgoing packet is not identified in the history table;

wherein the history table stores the information identifying the destination node of the previously transmitted packet including relay path information; and when the source routing transmitting processor transmits the outgoing packet, the source routing transmitting processor stores information identifying the destination node of the outgoing packet in the history table.

8. The wireless communication apparatus of claim 7, further comprising:

a cache routing table for storing entries, each entry listing a destination node and a relay node;

a relay/receiving method selector for examining a header of a newly received packet to decide whether to relay the newly received packet by source routing or by cache routing;

a cache routing relay/receiving processor for, when the relay/receiving method selector decides to relay the newly received packet by cache routing, finding an entry in the cache routing table including a destination node of the newly received packet, and relaying the newly received packet to the relay node listed in the entry found in the cache routing table; and a source routing relay/receiving processor for, when the relay/receiving method selector decides to relay the newly received packet by source routing, relaying the newly received packet to a relay node indicated in a relay path specified in the newly received packet.

9. The wireless communication apparatus of claim 7, wherein:

the history table stores the information identifying the source node of the previously received packet including relay path information.

10. A wireless communication apparatus for use in a multi-hop network, comprising:

a cache routing table for storing entries, each entry listing a destination node and a relay node;

a relay/receiving method selector for examining a header of a received packet to decide whether to relay the received packet by source routing or by cache routing;

a cache routing relay/receiving processor for, when the relay/receiving method selector decides to relay the received packet by cache routing, finding an entry in the cache routing table listing a destination node specified in the received packet, and relaying the received packet to the relay node listed in the entry found in the cache routing table;

a source routing relay/receiving processor for, when the relay/receiving method selector decides to relay the received packet by source routing, relaying the received packet to a relay node indicated in a relay path specified in the received packet; and a route record processor, wherein, when the wireless communication apparatus receives a route record packet including relay path information describing a relay path by which the route record packet has been relayed from a source node to the wireless communication apparatus, the route record processor stores a new entry in the cache routing table, listing the source node as the destination node in the new entry, and listing a relay node from which the route record packet was received as the relay node in the new entry.

11. A non-transitory machine readable tangible medium storing a wireless communication program executable by a wireless communication apparatus residing in a node in a multi-hop network, the program including instructions for transmitting, relaying, and receiving packets by a method of transmitting a packet from a first node in a network to a second node in the network via a relay path including at least one relay node in the network, the method comprising:

checking a history table stored at the first node;

adding information specifying the second node, the relay path, and source routing to a header of the packet if the second node is not identified in the history table;

adding information specifying the second node and cache routing but not specifying the relay path to the header of the packet if the second node is identified in the history table;

transmitting the packet with the information added to its header from the first node;

checking the header of the packet at each relay node on the relay path;

transmitting the packet from said each relay node to a next relay node in the relay path specified in the header of the packet if the header specifies source routing;

transmitting the packet from said each relay node to a next relay node indicated in a cache routing table at the relay node if the header of the packet specifies cache routing; and receiving the packet at the second node;

wherein the wireless communication apparatus has a cache routing table, and the program further includes instructions for:

examining a header of a received packet to make a decision as to whether to relay the received packet by source routing or by cache routing;

finding an entry in the cache routing table listing a destination node of the received packet, and relaying the received packet to a relay node listed in said entry, if the decision is to relay the received packet by cache routing; and relaying the received packet to a node indicated in relay path information specified in the header of the received packet, if the decision is to relay the received packet by source routing.

12. The non-transitory machine readable tangible medium of claim 11, wherein the wireless communication apparatus has a history table, the program including instructions for:

storing information identifying a destination node of a transmitted packet including relay path information or a source node of a received packet including relay path information in the history table;

determining whether information identifying a destination node of an outgoing packet is stored in the history table;

transmitting the outgoing packet with a header specifying the destination node of the outgoing packet and cache routing, but not specifying a relay path, if the destination node of the outgoing packet is identified in the history table; and transmitting the outgoing packet with a header specifying the destination node of the outgoing packet, the relay path, and source routing if the destination node of the outgoing packet is not identified in the history table.

* * * * *